(12) United States Patent
Carter et al.

(10) Patent No.: US 9,007,962 B2
(45) Date of Patent: Apr. 14, 2015

(54) DEADLOCK-FREE ROUTING USING EDGE-DISJOINT SUB-NETWORKS

(71) Applicant: International Business Machines Corporation, Armonk, NY (US)

(72) Inventors: John B. Carter, Austin, TX (US); Colin K. Dixon, Austin, TX (US); Wesley M. Felter, Austin, TX (US); Ankit Singla, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 13/748,823

(22) Filed: Jan. 24, 2013

(65) Prior Publication Data

US 2014/0204738 A1 Jul. 24, 2014

(51) Int. Cl.
*H04L 12/24* (2006.01)
*H04L 12/803* (2013.01)

(52) U.S. Cl.
CPC .......... *H04L 41/0803* (2013.01); *H04L 47/122* (2013.01); *H04L 41/12* (2013.01)

(58) Field of Classification Search
CPC ..................................................... H04L 41/08
See application file for complete search history.

(56) References Cited

U.S. PATENT DOCUMENTS

| | | | |
|---|---|---|---|
| 4,933,933 A | 6/1990 | Dally et al. | |
| 5,659,796 A | 8/1997 | Thorson et al. | |
| 5,689,646 A | 11/1997 | Thorson | |
| 5,701,416 A | 12/1997 | Thorson et al. | |
| 5,781,546 A | 7/1998 | Sethu | |
| 5,898,826 A | 4/1999 | Pierce et al. | |
| 6,031,835 A | 2/2000 | Abali et al. | |
| 6,065,063 A | 5/2000 | Adali | |
| 6,249,520 B1 | 6/2001 | Steely, Jr. et al. | |
| 6,567,856 B1 | 5/2003 | Steele, Jr. et al. | |
| 6,938,094 B1 | 8/2005 | Keller et al. | |
| 6,950,438 B1 | 9/2005 | Owen et al. | |
| 6,992,988 B2 | 1/2006 | Reynders et al. | |
| 7,152,113 B2 | 12/2006 | Reynders et al. | |
| 7,200,117 B2 | 4/2007 | Chiu et al. | |

(Continued)

FOREIGN PATENT DOCUMENTS

CN 1787478 6/2006

OTHER PUBLICATIONS

International Patent Application No. PCT/IB2014/058114, International Search Report and Written Opinion dated May 8, 2014, 9 pages.

(Continued)

*Primary Examiner* — Jianye Wu
(74) *Attorney, Agent, or Firm* — Cantor Colburn LLP; William Stock

(57) ABSTRACT

An aspect includes deadlock-free routing on arbitrary network topologies using edge-disjoint sub-networks. A network topology of a network is identified. The network includes a plurality of links between a plurality of switches. Each of the links is identified as an edge. A plurality of edge-disjoint sub-networks is constructed from the network topology of the network by routing configuration logic. The plurality of edge-disjoint sub-networks is formed by edges between the switches such that the edges are disjoint relative to each of the edge-disjoint sub-networks. The switches are configured to route traffic on the network with each route staying entirely within one of the plurality of edge-disjoint sub-networks within the network.

18 Claims, 8 Drawing Sheets

(56) References Cited

U.S. PATENT DOCUMENTS

| | | | |
|---|---|---|---|
| 7,379,424 | B1 | 5/2008 | Krueger |
| 7,466,701 | B2 | 12/2008 | Mondinelli et al. |
| 7,565,657 | B1 | 7/2009 | Leung et al. |
| 7,568,118 | B2 | 7/2009 | Anderson et al. |
| 7,573,810 | B2 | 8/2009 | Herring et al. |
| 7,643,477 | B2 | 1/2010 | Spink et al. |
| 7,724,674 | B2 | 5/2010 | Lysne |
| 7,809,006 | B2 | 10/2010 | Towles |
| 2003/0043756 | A1* | 3/2003 | Reynders et al. .......... 370/254 |
| 2003/0140165 | A1* | 7/2003 | Chiu et al. ................ 709/238 |
| 2003/0172180 | A1 | 9/2003 | Reynders et al. |
| 2006/0209714 | A1 | 9/2006 | Ackermann-Markes et al. |
| 2007/0076719 | A1 | 4/2007 | Allan et al. |
| 2008/0080535 | A1 | 4/2008 | Li et al. |

OTHER PUBLICATIONS

J. Flich, et al., "A Survey and Evaluation of Topology-Agnostic Deterministic Routing Algorithms," IEEE Transactions on Parallel and Distributed Systems, vol. 23, No. 3, Mar. 2012, 21 pages.

H. Wang, et al., "Construction of Edge-Disjoint Spanning Trees in the Torus and Application to Multicast in Wormhole-Routed Networks," Proc. 1999 Int'l Conf. on Parallel and Distributed Computing Systems, 1999, pp. 178-184.

N. Choudhard, et al., "Deadlock-Free Routing in Irregular Interconnection Networks for Complex SoCs, International Journal of Engineering and Advanced Technology (IJEAT)," ISSN: 2249-8958, vol. 1, Issue 2, Dec. 2011, 6 pages.

W. Dally, et al., "Deadlock-Free Message Routing in Multiprocessory Interconnection Networks," IEEE Transactions on Computers, vol. C-36, No. 5, May 1987, pp. 547-553.

S. Reinemo, et al., "Ethernet as a Lossless Deadlock-Free System Area Network," ISPA 2005, LNCS 3758, 2005, pp. 901-914.

H. Park, "Generic Methodologies for Deadlock-Free Routing," 1996 IEEE Proceedings of IPPS '96, pp. 638-643.

M. Koibuchi, et al., "L-turn Routing: An Adaptive Routing in Irregular Networks," International Conference on Parallel Processing, Sep. 3-7, 2001, pp. 383-392.

H. Wang, et al., "Multicast in Wormhole-Switched Torus Networks using Edge-Disjoint Spanning Trees," Journal of Parallel and Distributed Computing, Special Issue on Routing in Computer and Communicatin Networks, Sep. 2001, pp. 1278-1306.

A. Itai, et al., "The Multi-Tree Approach to Reliabiilty in Distributed Networks," Information and Computation, 1984, vol. 79, pp. 43-59.

* cited by examiner

DEADLOCK-FREE ROUTING USING EDGE-DISJOINT SUB-NETWORKS

BACKGROUND

The present invention relates to network routing and, more specifically, to deadlock-free routing on arbitrary network topologies using edge-disjoint sub-networks.

Ethernet networks are typically employed in local area networks (LANs) that include a plurality of configurable switches. An enhancement to Ethernet, called data center bridging (DCB), converged enhanced Ethernet (CEE) or data center Ethernet (DCE)—but referred to generally herein as DCB, supports the convergence of LANs with storage area networks (SANs). DCB augments standard Ethernet with a per-hop flow control protocol to ensure that packets are never dropped due to switch buffer overflow. DCB's per-hop flow control mechanism is based on "backpressure"—a receiving port issues a pause frame to the sending port if its buffer occupancy exceeds a fixed threshold. After receiving a pause frame, the sending port ceases transmission until the pause expires, typically on the timescale of a few packets worth of transmission time. If the sending switch's buffer reaches the occupancy threshold, it sends pause frames upstream, thus propagating the backpressure. Traditional Ethernet avoids deadlocks by dropping packets when buffer space is not available; however, dropping packets is not an option in lossless networks such as DCB or Infiniband.

When multiple potential paths exist through a group of network nodes (i.e., switches), where each node has a buffer to queue packets, a cycle of buffer dependencies can result in a routing deadlock. For example, in a group of three nodes A, B, C, there can be three paths, A-B-C, B-C-A, and C-A-B. If flows are started on all three paths, buffers at each node can fill and block which results in sending pause packets while waiting for respective buffers to clear at nodes A, B, C. While the routing paths A-B-C, B-C-A, and C-A-B are loop-free, cyclic dependencies can develop when flow A-B-C waits for flow B-C-A, which waits in turn for flow C-A-B. This risk of deadlock may reduce the overall use of lossless Ethernet, particularly for larger network implementations where ensuring deadlock-free routing is more challenging.

SUMMARY

According to an aspect of the present invention, a method for deadlock-free routing on arbitrary network topologies using edge-disjoint sub-networks is provided. A network topology of a network is identified. The network includes a plurality of links between a plurality of switches. Each of the links is identified as an edge. A plurality of edge-disjoint sub-networks is constructed from the network topology of the network by routing configuration logic. The plurality of edge-disjoint sub-networks is formed by edges between the switches such that the edges are disjoint relative to each of the edge-disjoint sub-networks. The switches are configured to route traffic on the network with each route staying entirely within one of the plurality of edge-disjoint sub-networks within the network.

According to another aspect of the present invention, a system for deadlock-free routing on arbitrary network topologies using edge-disjoint sub-networks is provided. The system includes a network including a plurality of links between a plurality of switches. Routing configuration logic is configured to identify a network topology of the network. Each of the links is identified as an edge. A plurality of edge-disjoint sub-networks is constructed from the network topology of the network by the routing configuration logic. The plurality of edge-disjoint sub-networks is formed by edges between the switches such that the edges are disjoint relative to each of the edge-disjoint sub-networks. The switches are configured to route traffic on the network with each route staying entirely within one of the plurality of edge-disjoint sub-networks within the network.

According to a further aspect of the present invention, a computer program product for deadlock-free routing on arbitrary network topologies using edge-disjoint sub-networks is provided. The computer program product includes a computer readable storage medium having computer-readable program code embodied thereon, which when executed by a computer processor, causes the computer processor to implement a method. The method includes identifying a network topology of a network. The network includes a plurality of links between a plurality of switches. Each of the links is identified as an edge. A plurality of edge-disjoint sub-networks is constructed from the network topology of the network. The plurality of edge-disjoint sub-networks is formed by edges between the switches such that the edges are disjoint relative to each of the edge-disjoint sub-networks. The switches are configured to route traffic on the network with each route staying entirely within one of the plurality of edge-disjoint sub-networks within the network.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to deadlock-free routing using edge-disjoint sub-networks. By configuring resources of a network as a group of edge-disjoint sub-networks, the risk of routing deadlocks is removed from the network. Embodiments may be applied to networks employing lossless Ethernet standards, such as data center bridging (DCB), in data center environments. The processes as described herein are applicable to a wide variety of network topologies (i.e., arbitrary topologies).

Figure 1:
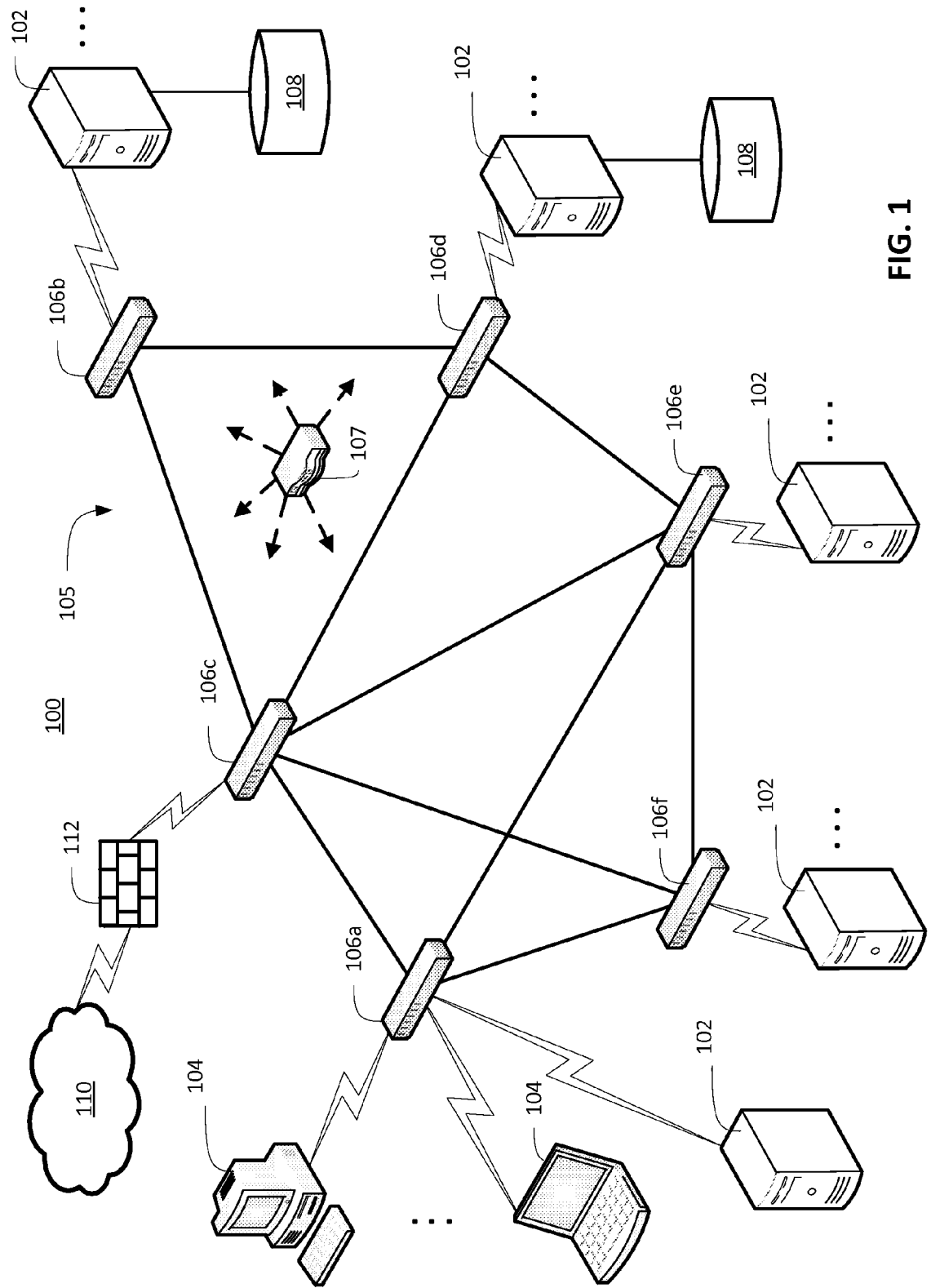
FIG. 1 depicts a block diagram of a system upon which deadlock-free routing using edge-disjoint sub-networks may be implemented according to an embodiment of the present invention.

Turning now to FIG. 1, an example of a system 100 upon which deadlock-free routing using edge-disjoint sub-networks may be implemented will now be described in greater detail. In the example depicted in FIG. 1, the system 100 is a data center environment including a plurality of host systems 102 and client systems 104 configured to communicate over a network 105 of switches 106. In exemplary embodiments, the host systems 102, each referred to generally as a host or host system, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. The host systems 102 may be storage system controllers configured to access and store large amounts of data to one or more data storage systems 108.

In exemplary embodiments, the client systems 104 can include a variety of desktop, laptop, general-purpose computer devices, mobile computing devices, and/or networked devices with processing circuits and input/output (I/O) interfaces, such as a keys/buttons, a touch screen, audio input, a display device and audio output. The system 100 may also include a network controller 107 that can configure elements of the network 105. For example, the network controller 107 can configure switches 106a, 106b, 106c, 106d, 106e, and 106f in the simplified example of network 105 to control routing paths between host systems 102 as well as access to one or more external networks 110 through a firewall 112. The host systems 102, client systems 104, and network controller 107 can include various computer/communication hardware and software technology known in the art, such as one or more processing units or circuits, volatile and non-volatile memory including removable media, power supplies, network interfaces, support circuitry, operating systems, and the like. Although the network controller 107 is depicted as a separate component, it will be understood that network configuration functionality can alternatively be implemented in one or more of the host systems 102, the client systems 104, or within the switches 106 in a standalone or distributed format.

The network 105 can include a combination of wireless, wired, and/or fiber optic links. The network 105 may support a variety of known communication standards that allow data to be transmitted between the host systems 102, the client systems 104, and the switches 106. In exemplary embodiments, the network 105 is configured as a lossless Ethernet network. The switches 106 can support data center bridging (DCB) as a lossless Ethernet protocol. The network 105 represents a simplified example for purposes of explanation. An embodiment of the network 105 can include numerous switches 106 (e.g., hundreds) with dozens of ports and links per switch 106.

The data storage systems 108 refer to any type of computer readable storage media and may comprise one or more secondary storage elements, e.g., hard disk drive (HDD), solid-state memory, tape, or a storage subsystem that is internal or external to the host systems 102. Types of data that may be stored in the data storage systems 108 include, for example, various files and databases. There may be multiple data storage systems 108 utilized by each of the host systems 102, which can be distributed in various locations of the system 100.

Figure 2:
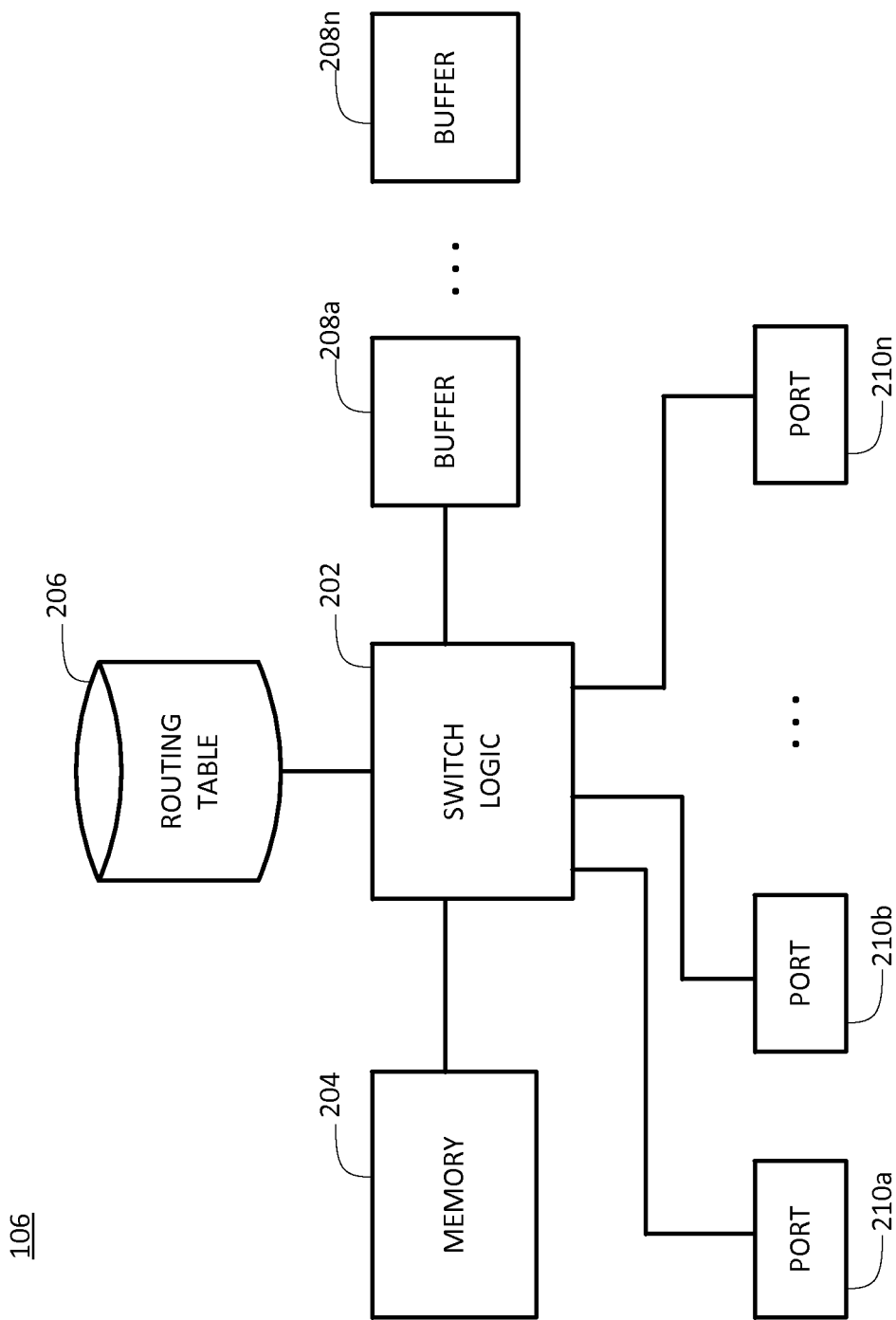
FIG. 2 depicts a block diagram of a switch according to an embodiment of the present invention.

FIG. 2 depicts a block diagram of an example generalized implementation of switch 106 representing each of the switches 106a-106f of FIG. 1. The switch 106 includes switch logic 202, memory 204, routing table 206, buffers 208a-208n, and ports 210a-210n. The switch logic 202 may be implemented in one or more processing circuits. Memory 204 may be a computer readable storage medium configured to hold instructions for the switch logic 202, as well as various variables and constants to support operation of the switch 106. The routing table 206 may store tuples for routing packets to various components coupled to ports 210a-210n. For example, the routing table 206 can hold virtual local area network (VLAN) tags, as further described herein, and a plurality of destination media access control (MAC) addresses to establish paths between the switches 106a-106f of FIG. 1. The buffers 208a-208n provide queues for routing packets between the ports 210a-210n. Each of the buffers 208a-208n may be associated with a particular port and/or sub-network. Each of the buffers 208a-208n is logically separate but need not be physically independent. Accordingly, when one of the buffers 208a-208n is full, it does not adversely impact the performance of the other buffers 208a-208n within the switch 106.

Figure 3:
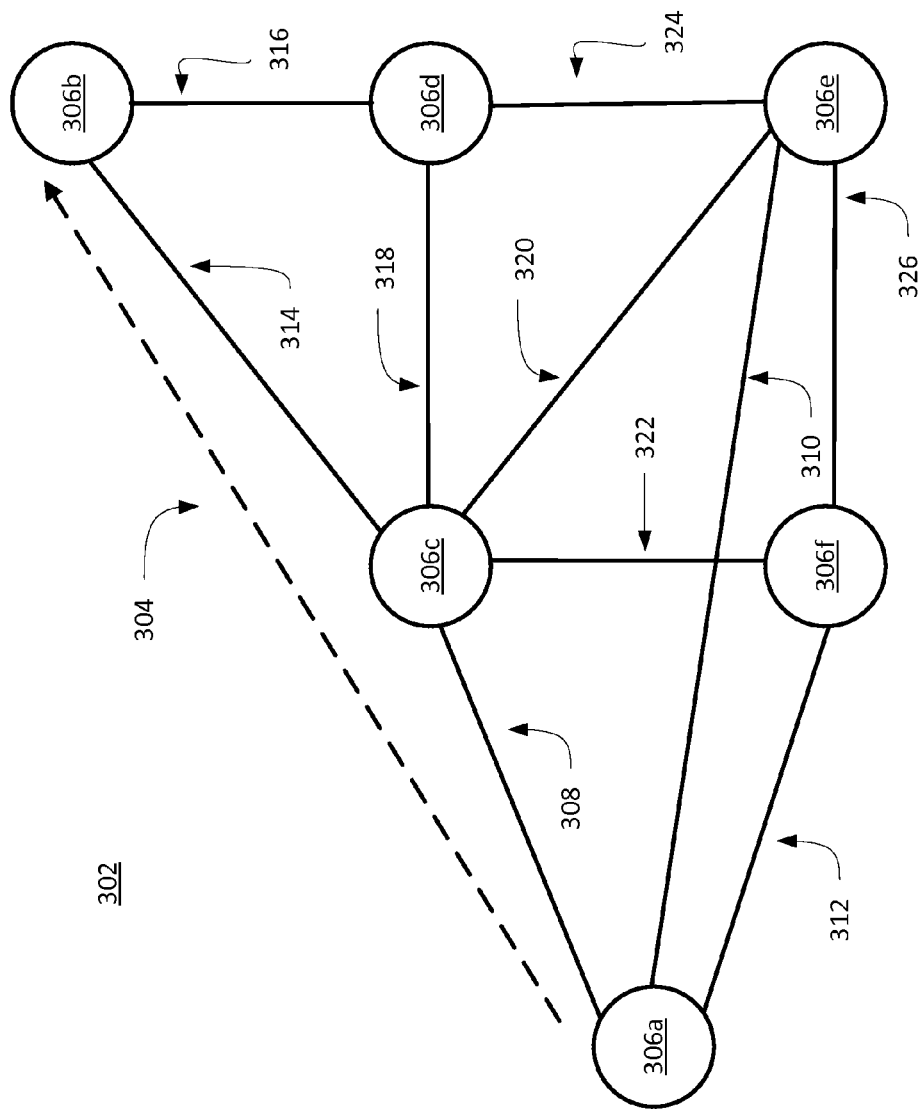
FIG. 3 depicts an example of a network topology of a network according to an embodiment of the present invention.

FIG. 3 depicts an example of a network topology 302 of the network 105 of FIG. 1. A routing path (also referred to as a path or route) through the network topology 302 typically involves a plurality of nodes or switches and edges or links. For example, a path 304 between switch 306a and switch 306b passes through switch 306c. In the example network topology 302 of FIG. 3, there are six switches 306a-306f representing the switches 106a-106f of FIG. 1. Switch 306a is coupled to switch 306c by link 308, to switch 306e by link 310, and to switch 306f by link 312. Switch 306b is coupled to switch 306c by link 314 and to switch 306d by link 316. Switch 306c is also coupled to switch 306d by link 318, to switch 306e by link 320, and to switch 306f by link 322. Switch 306d is coupled to switch 306e by link 324, and switch 306e is coupled to switch 306f by link 326. Accordingly, if all of the links and switches are available for routing of packets within the network topology 302, path 304 represents one possible routing path between switches 306a and 306b; however, numerous paths may be available such as switches 306a to 306c to 306b or switches 306a to 306f to 306e to 306d to 306b, etc.

The network topology 302 represents an example topology for a lossless network, where busy nodes or switches are required to wait (pause and block) such that packets are not dropped. In order to ensure that routing deadlocks are avoided, exemplary embodiments construct a plurality of edge-disjoint sub-networks formed by edges between the switches 306 such that the edges are disjoint relative to each of the other edge-disjoint sub-networks. Additionally, there can be multiple layers of edge-disjoint sub-networks for the network topology 302. For example, by using a type-of-service or quality-of-service field in the DCB Ethernet protocol to define layers or virtual links, eight layers can be defined where each layer includes a plurality of edge-disjoint sub-networks. In other words, the network topology 302 of FIG. 3 can be viewed as a stack of layers where each of the links 308-326 of FIG. 3 is used to form sub-networks, and each edge is used only once across all sub-networks of network topology 302 at the same layer. The edge-disjoint sub-networks remove cyclic link dependencies as each edge-disjoint sub-network is loop-free and therefore deadlocks are avoided. One or more methods, e.g., shortest path, can be used to select which of the edge-disjoint sub-networks to use to route a packet between a pair of switches or hosts, such as switches 306a and 306b or two host systems 102 of FIG. 1.

Figure 4B:
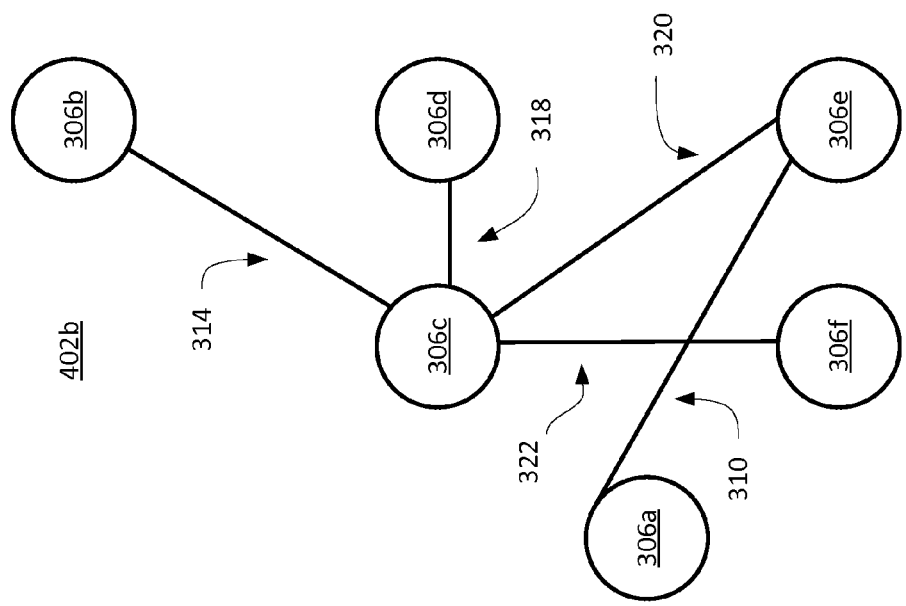
FIG. 4b depicts an example of a second edge-disjoint spanning tree formed from the example network topology of FIG. 3 according to an embodiment of the present invention.
Figure 4A:
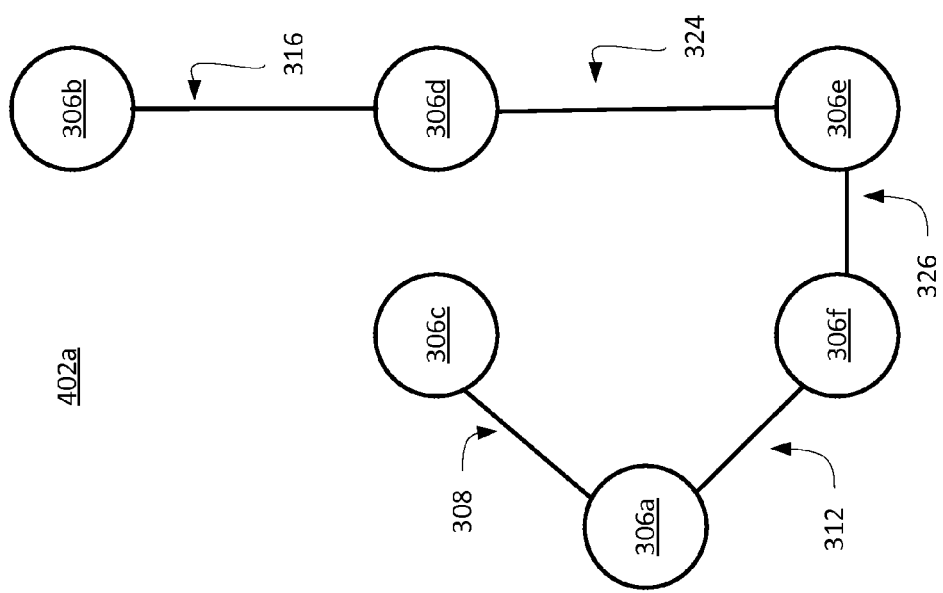
FIG. 4a depicts an example of a first edge-disjoint spanning tree formed from the example network topology of FIG. 3 according to an embodiment of the present invention.

A variety of tree or graph topologies can be used to form the edge-disjoint sub-networks, and the selected tree/graph topology may vary between different layers of the overall network topology. In an embodiment, edge-disjoint spanning trees (EDSTs) that are deadlock-isolated from each other are constructed from the network topology 302. FIGS. 4a and 4b depict examples of edge-disjoint spanning trees 402a and 402b formed from the example network topology 302 of FIG. 3. The edge-disjoint spanning tree 402a represents a first edge-disjoint sub-network and edge-disjoint spanning tree 402b represents a second edge-disjoint sub-network. The edge-disjoint spanning tree 402a includes all of the switches 306a-306f of FIG. 3, but only includes edges 308, 312, 316, 324, and 326 of FIG. 3. The edge-disjoint spanning tree 402b also includes all of the switches 306a-306f of FIG. 3, but only includes edges 310, 314, 318, 320, and 322 of FIG. 3. As can be seen in FIGS. 4A and 4B, there are no common edges between edge-disjoint spanning trees 402a and 402b. Each of the edge-disjoint spanning trees 402a and 402b provides separate path options between all of the switches 306.

Various methods can be used to determine whether the sub-network associated with edge-disjoint spanning tree 402a or edge-disjoint spanning tree 402b would be preferable in selecting a routing path between a pair of switches 306. For example, based on path length, edge-disjoint spanning tree 402a would be preferable when traversing from switch 306a to 306f, but edge-disjoint spanning tree 402b would be preferable when traversing from switch 306a to switch 306b. Examples of methods that can be considered in selecting an edge-disjoint sub-network to determine a preferred routing path include: round robin selection, random selection, hashing-based selection, current queue length-based selection from buffers 208a-208n of FIG. 2, port status of ports 210a-210n of FIG. 2, as well as other path selection algorithms known in the art.

Figure 4C:
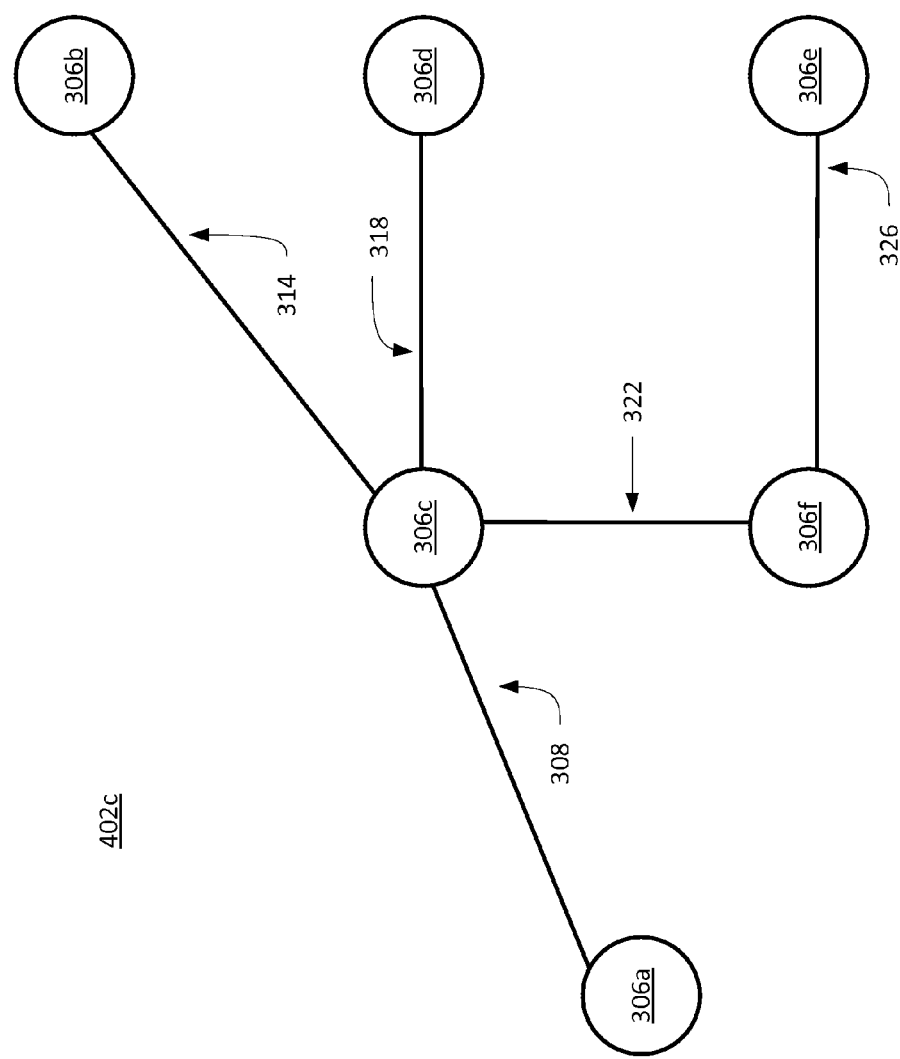
FIG. 4c depicts an example of a third edge-disjoint spanning tree formed from the example network topology of FIG. 3 using virtual links according to an embodiment of the present invention.

As previously noted, the number of potential edge-disjoint sub-networks from which to select a path can be increased by splitting the network topology 302 of FIG. 3 into a number of independent layers, where each layer forms a set of virtual links between the switches 306a-306f. When multiple layers are used, physical links can be reused between layers, and the edges represent virtual lanes rather than physical links. FIG. 4c depicts an edge-disjoint spanning tree 402c formed from the network topology 302 of FIG. 3 using virtual links. In this example, the edge-disjoint spanning trees 402a and 402b are on one layer or virtual link, and the edge-disjoint spanning tree 402c is on another layer or set of virtual links. The edge-disjoint spanning tree 402c includes switch 306a-306f of FIG. 3, as well as links 308, 314, 318, 322, and 326. While the links 308 and 326 are used in both edge-disjoint spanning trees 402a and 402c, and links 314, 318, and 322 are used in both edge-disjoint spanning trees 402b and 402c, the edges are defined separately per layer and thus are disjoint across all of the edge-disjoint spanning trees 402a-402c. Each edge per layer is associated with a different buffer 208a-208n per switch of FIG. 2, and thus blocking associated with one buffer does not result in blocking of other buffers that share a common physical link.

Figure 5:
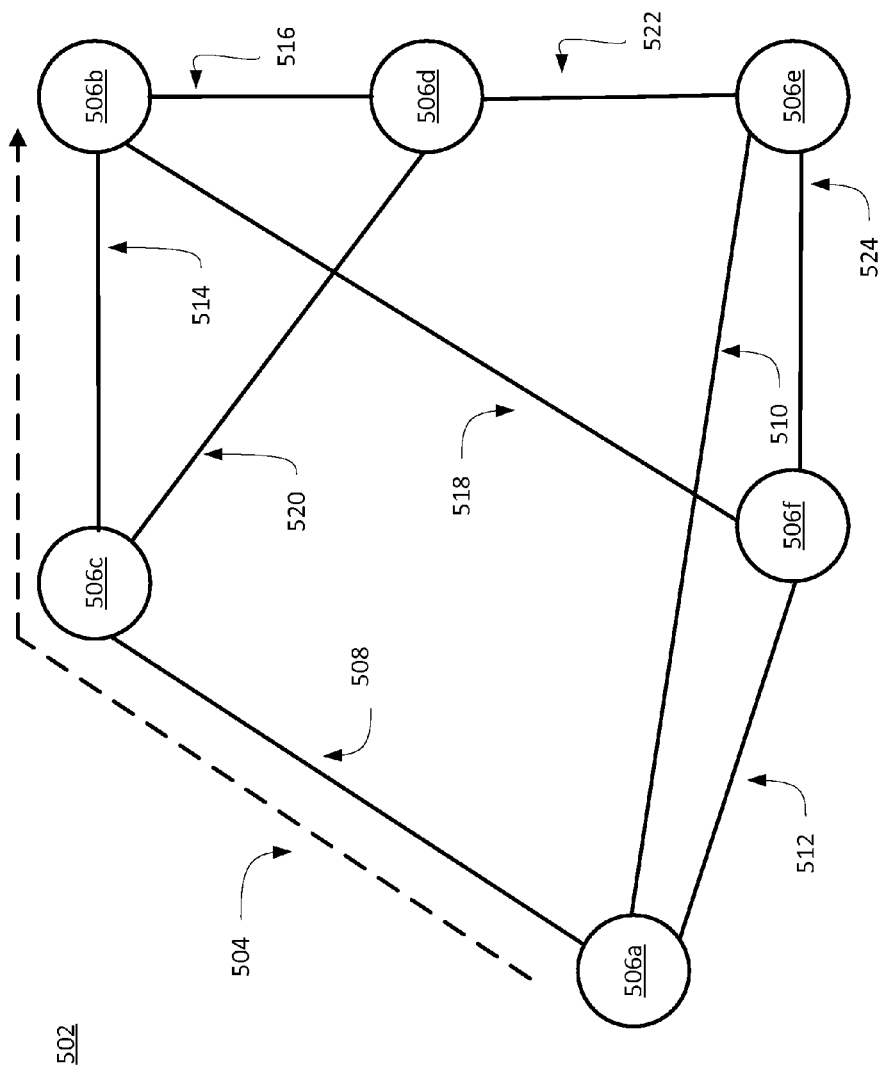
FIG. 5 depicts an example of another network topology of a network for an edge-disjoint random regular graph according to an embodiment of the present invention.

FIG. 5 depicts an example of another network topology 502 of a network for an edge-disjoint random regular graph according to an embodiment. In the embodiment of FIG. 5, a different link arrangement exists between switches 506 as compared to switches 306 of FIG. 3. The edge-disjoint random regular graph of FIG. 5 is also referred to as an edge-disjoint random 3-regular graph, as each switch 506 has 3 links. The network topology 502 for an edge-disjoint random regular graph can be formed from a network topology that includes additional links, where a subset of the links are randomly selected such that each of the switches has a same number of links available (three in this example) to form a regular graph. As previously described, edge-disjoint spanning trees and edge-disjoint random regular graphs are merely examples of a large array of possible edge-disjoint sub-networks that could be used in embodiments. In particular, such sub-networks need not be spanning (i.e., edge-disjoint non-spanning sub-networks) and could only interconnect a subset of the switches in a network.

A routing path through the network topology 502 typically involves a plurality of nodes or switches and edges or links. For example, a path 504 between switch 506a and switch 506b passes through switch 506c. In the example network topology 502 of FIG. 5, there are six switches 506a-506f representing the switches 106a-106f of FIG. 1 but having different links available for routing. Switch 506a is coupled to switch 506c by link 508, to switch 506e by link 510, and to switch 506f by link 512. Switch 506b is coupled to switch 506c by link 514, to switch 506d by link 516, and to switch 506f by link 518. Switch 506c is also coupled to switch 506d by link 520. Switch 506d is coupled to switch 506e by link 522, and switch 506e is coupled to switch 506f by link 524. Accordingly, if all of the links and switches are available for routing of packets within the network topology 502, path 504 represents one possible routing path between switches 506a and 506b; however, numerous paths may be available such as switches 506a to 506c to 506b or switches 506a to 506f to 506e to 506d to 506b, etc. As described relative to FIGS. 4a-4c, the network topology 502 for an edge-disjoint random regular graph can also be split into a plurality of edge-disjoint sub-networks and layers/virtual links (not depicted). Note that because an edge-disjoint random 3-regular graph is not necessarily acyclic, a different technique can be used to ensure deadlock-freedom. For example, an Up*/Down* algorithm, as known in contemporary system, can be used to compute deadlock free paths within such and edge-disjoint sub-networks.

Figure 6:
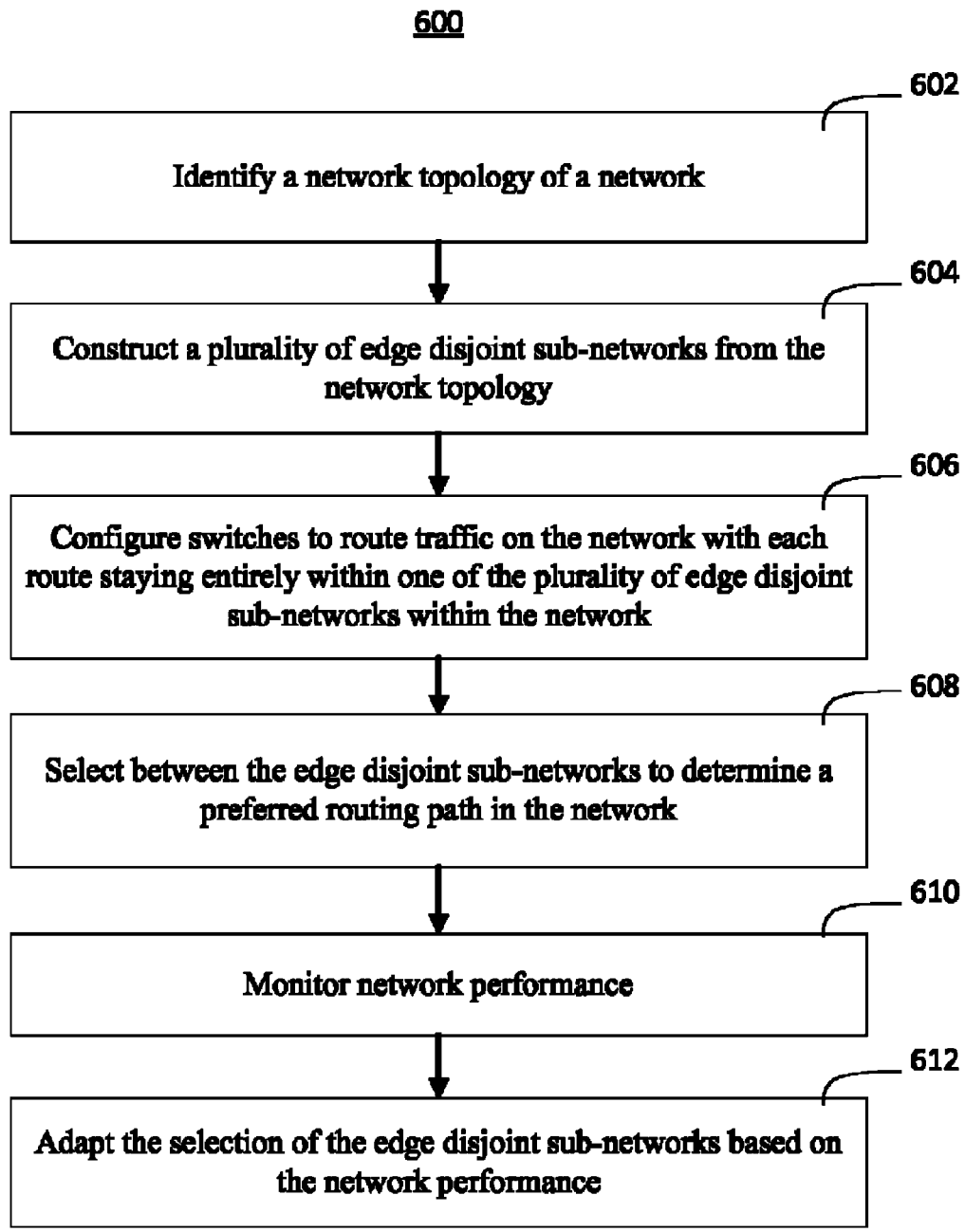
FIG. 6 depicts a flow diagram of a process for deadlock-free routing using edge-disjoint sub-networks according to an embodiment of the present invention.

Turning now to FIG. 6, a flow diagram of a process 600 for deadlock-free routing using edge-disjoint sub-networks will be described in an exemplary embodiment. The process 600 is described in reference to FIGS. 1-5 and can be implemented by the system 100 of FIG. 1. Network configuration can be managed by routing configuration logic located in one or more of the host systems 102, client systems 104, switches 106, or network controller 107.

At block 602, a network topology of a network is identified, such as network topology 302 of FIG. 3. The network, such as network 105 of FIG. 1, includes plurality of links between a plurality of switches. Each of the links is identified as an edge within a layer.

At block 604, routing configuration logic constructs a plurality of edge-disjoint sub-networks from the network topology of the network. The edge-disjoint sub-networks are formed by edges between the switches such that the edges are disjoint relative to each of the edge-disjoint sub-networks. The edge-disjoint spanning trees 402a and 402b of FIGS. 4a and 4b are examples of edge-disjoint sub-networks for switches 306a-f and edges 308-326. The network topology 302 of FIG. 3 can be split into a number of independent layers, where each layer forms a set of virtual links between the plurality of switches 306a-f. The plurality of edge-disjoint sub-networks is formed for each of the layers such that the edge-disjoint sub-networks are edge-disjoint per layer and virtual link disjoint between layers. Each of the edge-disjoint sub-networks can be formed by randomly selecting edges of the network topology per layer 302 to form a path between a group of the switches 306a-f and removing the selected edges from consideration for other edge-disjoint sub-networks within the layer. In other examples, a group of switches from which edge-disjoint sub-networks are formed can include all of the switches or a subset of the switches. In addition to random selection, other methods can be used to select edges for each edge-disjoint sub-network, for example maximizing the number of remaining nodes with a sufficient number of attached links to build another such edge-disjoint sub-network.

At block 606, the switches are configured to route traffic between the switches and/or hosts on the network with each route staying entirely within one of the plurality of edge-disjoint sub-networks within the network. For example, a routing table, e.g., routing table 206 of FIG. 2, in each switch is updated to reflect routing paths to support each of the edge-disjoint sub-networks. When multiple layers are used, a virtual local area network (VLAN) tag is assigned to each of the edge-disjoint sub-networks in each of the layers. The routing table in each of the switches can be configured to include the VLAN tags as edge-disjoint sub-networks identifiers and a plurality of destination media access control (MAC) addresses to establish paths between the switches and/or hosts. Each of the edge-disjoint sub-networks provides separate paths between the switches and/or hosts, and each of the edge-disjoint sub-networks has a separate buffer allocation, e.g., buffers 208a-n of FIG. 2, in each of the switches. In addition to VLAN tags, any other type of edge-disjoint sub-network identifiers can be employed in the routing tables of the switches.

At block 608, selection is performed between the edge-disjoint sub-networks to determine a preferred routing path between a pair of the switches and/or hosts based on one or more methods. The methods can be based on both static and dynamic attributes of the edge-disjoint sub-networks. For example, path length, queue length, port status, and congestion can be considered in selecting between the edge-disjoint sub-networks. The selection may be performed at an ingress switch, a host system 102, or network controller 107 of FIG. 1. Selection can include more than one of the edge-disjoint sub-networks in parallel. Multi-path routing may be performed to establish parallel communication between a pair of switches and/or hosts on two or more of the edge-disjoint sub-networks.

At block 610, network performance may be monitored for congestion and other issues on the edge-disjoint sub-networks. The monitoring can be based on receiving a plurality of pause frames at a switch in the network associated with an active routing path of an edge-disjoint sub-network. A congested edge may be identified at the switch based on receiving a predetermined number or frequency of the pause frames or other mechanisms, such as direct monitoring with simple network management protocol (SNMP) or sFlow.

At block 612, selection of the edge-disjoint sub-networks may be adapted based on the network performance. Upon determining that a congested edge exists, the active routing path of the switch can be modified to shift from a first subset of one or more edge-disjoint sub-networks to a second subset of one or more edge-disjoint sub-networks of the plurality of edge-disjoint sub-networks. Shifting between the subsets of one or more edge-disjoint sub-networks can be controlled by routing configuration logic located in one or more of the host systems 102, client systems 104, switches 106, or network controller 107 of FIG. 1.

Figure 7:
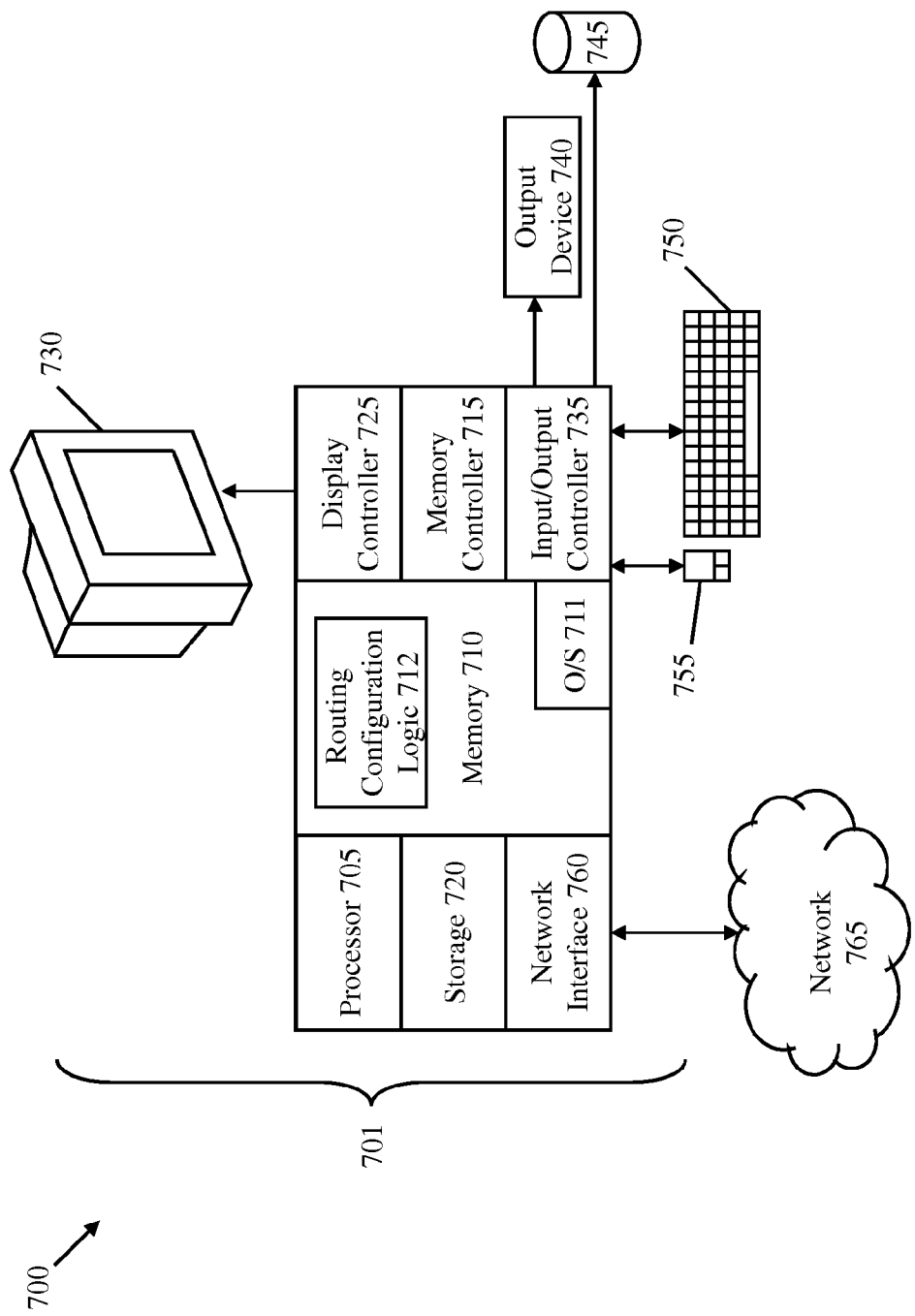
FIG. 7 depicts an example block diagram of a processing system according to an embodiment of the present invention.

FIG. 7 illustrates a block diagram of a processing system 700 for deadlock-free routing using edge-disjoint sub-networks. The processes as previously described can be implemented in system 700 in hardware, software (e.g., firmware), or a combination thereof as part of a special or general-purpose digital computer, such as a personal computer, workstation, minicomputer, or mainframe computer. The system 700 therefore includes general-purpose computer 701 as illustrated in FIG. 7. The general-purpose computer 701 is an embodiment of one or more of the host systems 102, client systems 104, and/or network controller 107 of FIG. 1.

In an exemplary embodiment, in terms of hardware architecture, as shown in FIG. 7, the computer 701 includes a computer processor 705 and memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The computer processor 705 is a hardware device for executing software, particularly software stored in storage 720, such as cache storage, or memory 710. The computer processor 705 can be any custom made or commercially available computer processor, a central processing unit (CPU), an auxiliary processor among several processors associated with the computer 701, a semiconductor based microprocessor (in the form of a microchip or chip set), a macro-processor, or generally any device for executing instructions.

The memory 710 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the computer processor 705.

The instructions in memory 710 may include one or more separate programs, each of which comprises an ordered listing of executable instructions for implementing logical functions. In the example of FIG. 7, the instructions in the memory 710 include a suitable operating system (OS) 711 and routing configuration logic 712 as previously described. The operating system 711 essentially controls the execution of other computer programs and provides scheduling, input-output control, file and data management, memory management, and communication control and related services. Although depicted in the memory 710, the routing configuration logic 712 can be implemented in whole or in part within other processing circuitry (not depicted) of the computer 701.

In an exemplary embodiment, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate with both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730. In an exemplary embodiment, the system 700 can further include a network interface 760 for coupling to a network 765. The network interface 760 and components of the network 765 can be configured by the routing configuration logic 712, a host on the network or a network controller. The network 765 can be an IP-based network for communication between the computer 701 and any external server, client and the like via a broadband connection. The network 765 transmits and receives data between the computer 701 and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, a storage area network in a data center environment, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 701 is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the computer processor 705 is configured to execute instructions stored within the memory 710, to communicate data to and from the memory 710, and to generally control operations of the computer 701 pursuant to the instructions.

Technical effects include providing deadlock-free routing using edge-disjoint sub-networks. Dividing a network topology into a plurality of levels, where each level includes edge-disjoint sub-networks further enhancing routing options while ensuring that deadlock-free routing is provided in a lossless network. The process of constructing edge-disjoint sub-networks can be implemented on networks of any size having an arbitrary topology.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, CLOS, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A method, comprising:
   identifying a network topology of a network, the network comprising a plurality of links between a plurality of switches, each of the links identified as an edge;
   constructing from the network topology of the network, by routing configuration logic, a plurality of edge-disjoint sub-networks formed by edges between the switches such that the edges are disjoint relative to each of the edge-disjoint sub-networks;
   splitting the network topology into a number of independent layers, each layer forming a set of virtual links between the plurality of switches;
   forming the plurality of edge-disjoint sub-networks for each of the layers such that the edge-disjoint sub-networks are edge-disjoint per layer and virtual link disjoint between layers, wherein each of the edge-disjoint sub-networks provides separate paths in the network and each of the edge-disjoint sub-networks has a separate buffer allocation in each of the switches;
   selecting among the edge-disjoint sub-networks to determine a preferred routing path;
   configuring the switches to route traffic on the network with each route staying entirely within one of the plurality of edge-disjoint sub-networks within the network;
   monitoring performance of the edge-disjoint sub-networks; and
   adapting a selection of one of the edge-disjoint sub-networks based on the performance.

2. The method of claim 1, further comprising:
   forming each of the edge-disjoint sub-networks by randomly selecting edges of the network topology per layer to form paths between a group of the switches and removing the selected edges from consideration for other edge-disjoint sub-networks within the layer.

3. The method of claim 1, further comprising:
   assigning an identifier to each of the edge-disjoint sub-networks in each of the layers; and
   configuring a routing table of each of the switches with the edge-disjoint sub-network identifiers and a plurality of destination media access control addresses to establish paths in the network.

4. The method of claim 1, further comprising:
   performing multi-path routing to establish parallel communication on two or more of the edge-disjoint sub-networks.

5. The method of claim 1, wherein monitoring performance comprises determining a congested edge exists in an active routing path at one of the switches; and adapting a selection comprises modifying the active routing path from a first edge-disjoint sub-network to a second edge-disjoint sub-network of the plurality of edge-disjoint sub-networks in response to determining that the congested edge exists.

6. The method of claim 1, wherein the edge-disjoint sub-networks are formed as one or more of: edge-disjoint spanning trees, edge-disjoint non-spanning sub-networks, and edge-disjoint random regular graphs.

7. The method of claim 1, wherein the monitoring is based on receiving a plurality of pause frames at one of the switches in the network associated with an active routing path of the selected one of the edge-disjoint sub-networks and identifying congestion based on the pause frames.

8. A system, comprising:
a network comprising a plurality of links between a plurality of switches; and
routing configuration logic configured to perform a method comprising:
identifying a network topology of the network, wherein each of the links is identified as an edge;
constructing from the network topology of the network, a plurality of edge-disjoint sub-networks as a plurality of edge-disjoint sub-networks formed by edges between the switches such that the edges are disjoint relative to each of the edge-disjoint sub-networks;
splitting the network topology into a number of independent layers, each layer forming a set of virtual links between the plurality of switches;
forming the plurality of edge-disjoint sub-networks for each of the layers such that the edge-disjoint sub-networks are edge-disjoint per layer and virtual link disjoint between layers, wherein each of the edge-disjoint sub-networks provides separate paths in the network and each of the edge-disjoint sub-networks has a separate buffer allocation in each of the switches;
selecting among the edge-disjoint sub-networks to determine a preferred routing path;
configuring the switches to route traffic on the network with each route staying entirely within one of the plurality of edge-disjoint sub-networks within the network;
monitoring performance of the edge-disjoint sub-networks; and
adapting a selection of one of the edge-disjoint sub-networks based on the performance.

9. The system of claim 8, wherein the routing configuration logic is further configured to perform:
forming each of the edge-disjoint sub-networks by randomly selecting edges of the network topology per layer to form paths between a group of the switches and removing the selected edges from consideration for other edge-disjoint sub-networks within the layer.

10. The system of claim 8, wherein the routing configuration logic is further configured to perform:
assigning an identifier to each of the edge-disjoint sub-networks in each of the layers; and
configuring a routing table of each of the switches with the edge-disjoint sub-network identifiers and a plurality of destination media access control addresses to establish paths in the network.

11. The system of claim 8, wherein the routing configuration logic is further configured to perform multi-path routing to establish parallel communication on two or more of the edge-disjoint sub-networks.

12. The system of claim 8, wherein monitoring performance comprises determining a congested edge exists in an active routing path at one of the switches; and adapting a selection comprises modifying the active routing path from a first edge-disjoint sub-network to a second edge-disjoint sub-network of the plurality of edge-disjoint sub-networks in response to determining that the congested edge exists.

13. The system of claim 8, wherein the monitoring is based on receiving a plurality of pause frames at one of the switches in the network associated with an active routing path of the selected one of the edge-disjoint sub-networks and identifying congestion based on the pause frames.

14. A computer program product, the computer program product comprising a non-transitory computer readable storage medium having computer-readable program code embodied thereon, which when executed by a computer processor, causes the computer processor to implement a method, the method comprising:
identifying a network topology of a network, the network comprising a plurality of links between a plurality of switches, each of the links identified as an edge;
constructing from the network topology of the network, a plurality of edge-disjoint sub-networks formed by edges between the switches such that the edges are disjoint relative to each of the edge-disjoint sub-networks;
splitting the network topology into a number of independent layers, each layer forming a set of virtual links between the plurality of switches;
forming the plurality of edge-disjoint sub-networks for each of the layers such that the edge-disjoint sub-networks are edge-disjoint per layer and virtual link disjoint between layers, wherein each of the edge-disjoint sub-networks provides separate paths in the network and each of the edge-disjoint sub-networks has a separate buffer allocation in each of the switches;
selecting among the edge-disjoint sub-networks to determine a preferred routing path;
configuring the switches to route traffic on the network with each route staying entirely within one of the plurality of edge-disjoint sub-networks within the network;
monitoring performance of the edge-disjoint sub-networks; and
adapting a selection of one of the edge-disjoint sub-networks based on the performance.

15. The computer program product of claim 14, further comprising:
forming each of the edge-disjoint sub-networks by randomly selecting edges of the network topology per layer to form paths between a group of the switches and removing the selected edges from consideration for other edge-disjoint sub-networks within the layer.

16. The computer program product of claim 14, further comprising:
assigning an identifier to each of the edge-disjoint sub-networks in each of the layers; and
configuring a routing table of each of the switches with the edge-disjoint sub-network identifiers and a plurality of destination media access control addresses to establish paths in the network.

17. The computer program product of claim 14, wherein monitoring performance comprises determining a congested edge exists in an active routing path at one of the switches; and adapting a selection comprises modifying the active routing path from a first edge-disjoint sub-network to a second edge-disjoint sub-network of the plurality of edge-disjoint sub-networks in response to determining that the congested edge exists.

18. The computer program product of claim 14, wherein the monitoring is based on receiving a plurality of pause frames at one of the switches in the network associated with an active routing path of the selected one of the edge-disjoint sub-networks and identifying congestion based on the pause frames.

* * * * *